United States Patent
Zhang et al.

(10) Patent No.: US 12,552,144 B2
(45) Date of Patent: Feb. 17, 2026

(54) MULTI-LAYER BLOWN FILM

(71) Applicant: Dow Global Technologies LLC, Midland, MI (US)

(72) Inventors: Lanhe Zhang, Pearland, TX (US); Jong Young Lee, Sugar Land, TX (US); Lori L. Kardos, Sugar Land, TX (US); Rajen M. Patel, Lake Jackson, TX (US); Shaun Parkinson, Tarragona (ES); Hrishikesh R. Munj, Lake Jackson, TX (US); Teresa P. Karjala, Lake Jackson, TX (US); Jose Eduardo Ruiz, Sugar Land, TX (US); Luis Duque, Tarragona (ES); Jesus Nieto, Cambrils (ES)

(73) Assignee: Dow Global Technologies LLC, Midland, MI (US)

( * ) Notice: Subject to any disclaimer, the term of this patent is extended or adjusted under 35 U.S.C. 154(b) by 49 days.

(21) Appl. No.: 17/616,325

(22) PCT Filed: Jun. 4, 2020

(86) PCT No.: PCT/US2020/036053
§ 371 (c)(1),
(2) Date: Dec. 3, 2021

(87) PCT Pub. No.: WO2020/247581
PCT Pub. Date: Dec. 10, 2020

(65) Prior Publication Data
US 2022/0234341 A1    Jul. 28, 2022

Related U.S. Application Data

(60) Provisional application No. 62/858,108, filed on Jun. 6, 2019.

(51) Int. Cl.
| | | |
|---|---|---|
| B32B 27/32 | (2006.01) | |
| B29C 48/00 | (2019.01) | |
| B29C 48/10 | (2019.01) | |
| B29C 48/21 | (2019.01) | |
| B29K 23/00 | (2006.01) | |
| B29L 23/00 | (2006.01) | |
| B32B 27/08 | (2006.01) | |

(52) U.S. Cl.
CPC .......... B32B 27/327 (2013.01); B29C 48/022 (2019.02); B29C 48/10 (2019.02); B29C 48/21 (2019.02); B32B 27/08 (2013.01); *B29K 2023/0625* (2013.01); *B29K 2023/065* (2013.01); *B29K 2995/0063* (2013.01); *B29L 2023/001* (2013.01); *B32B 2250/05* (2013.01); *B32B 2250/40* (2013.01)

(58) Field of Classification Search
CPC ............ B32B 2250/05; B32B 2250/40; B32B 2307/30; B32B 2307/50; B32B 2307/732; B32B 2439/06; B32B 27/08; B32B 27/32; B32B 27/327
See application file for complete search history.

(56) References Cited

U.S. PATENT DOCUMENTS

| | | | |
|---|---|---|---|
| 9,040,151 B2 | 5/2015 | Pavlik | |
| 9,123,269 B2 | 9/2015 | Ohlsson et al. | |
| 9,926,441 B2 | 3/2018 | Wang et al. | |
| 10,857,703 B2 | 12/2020 | Kalihari et al. | |
| 11,040,523 B2 | 6/2021 | Ruiz et al. | |
| 11,384,228 B2 | 7/2022 | Perez Muñoz et al. | |
| 2008/0286507 A1* | 11/2008 | Smithson | C08J 5/18 428/517 |
| 2011/0003099 A1 | 1/2011 | Vinck | |
| 2011/0165395 A1 | 7/2011 | Wallis | |
| 2011/0252745 A1* | 10/2011 | Breck | B32B 27/32 53/451 |
| 2012/0100356 A1* | 4/2012 | Ohlsson | B32B 27/327 428/218 |
| 2013/0123440 A1 | 5/2013 | Samples et al. | |

(Continued)

FOREIGN PATENT DOCUMENTS

| | | |
|---|---|---|
| EP | 1295185 B1 | 3/2004 |
| WO | 2012106025 A1 | 8/2012 |

(Continued)

OTHER PUBLICATIONS

DOW Innate™ ST50 Precision Packaging Resin (Technical Information, The Dow Chemical Company published Oct. 17, 2016).*
International Preliminary Report for Patentability for related PCT Application PCT/US2020/036053, mailed Dec. 16, 2021 (7 pgs).
International Search Report & Written Opinion for related PCT Application PCT/US2020/036053, mailed Aug. 26, 2020 (11 pgs).
Cao, Jian, "Three-layer Composite Multifunctional Wide-width Polyethylene Blow-molded Shelter Film," Plastics Science and Technology, No. 4, Aug. 6, 1994.

*Primary Examiner* — Alicia J Weydemeyer
(74) *Attorney, Agent, or Firm* — Jacob R. Graham

(57) ABSTRACT

The present disclosure provides a multi-layer blown film, comprising: a first skin layer and a second skin layer, where at least one of the first skin layer and the second skin layer comprises from 80 to 100 wt. % of a LLDPE, where the LLDPE has a density from 0.910 to 0.935 g/cm$^3$; a core layer between the first skin layer and the second skin layer, where the core layer comprises from 70 to 100 wt. % of a second LLDPE having density from 0.910 to 0.935 g/cm$^3$; and a first inner layer and a second inner layer, where at least one of the first inner layer and the second inner layer comprises from 80 to 100 wt. % of a HDPE, where the HDPE has a density from 0.940 to 0.970 g/cm$^3$; where the multi-layer blown film has a density from 0.925 to 0.940 g/cm$^3$ and a total thickness of 15 to 150 μm.

13 Claims, No Drawings

(56) References Cited

U.S. PATENT DOCUMENTS

| | | | |
|---|---|---|---|
| 2017/0129229 A1* | 5/2017 | Wang | C08J 5/18 |
| 2017/0136746 A1* | 5/2017 | Zhu | B29C 48/834 |
| 2018/0370201 A1 | 12/2018 | Farkas | |
| 2019/0322088 A1 | 10/2019 | Zhu et al. | |
| 2020/0165396 A1 | 5/2020 | Chen et al. | |
| 2022/0118750 A1 | 4/2022 | Buaszczyk et al. | |

FOREIGN PATENT DOCUMENTS

| | | | | |
|---|---|---|---|---|
| WO | 2017097573 A1 | 6/2017 | | |
| WO | WO-2018205220 A1 * | 11/2018 | | B32B 27/08 |

* cited by examiner

MULTI-LAYER BLOWN FILM

This application is a National Stage Application under 35 U.S.C. § 371 of International Application Number PCT/US2020/036053, filed Jun. 4, 2020 and published as WO 2020/247581 on Dec. 10, 2020, which claims the benefit to U.S. Provisional Application 62/858,108, filed Jun. 6, 2019, the entire contents of which are incorporated herein by reference in its entirety

FIELD OF DISCLOSURE

The present disclosure relates generally to a multi-layer film and more specifically to a multi-layer blown film for use in heavy duty shipping sack applications.

BACKGROUND

A heavy duty shipping sack (HDSS) can be used for a broad range of applications in the food, chemical and pharmaceutical industries. They are a time- and cost-saving packaging solution and enable high product protection. A HDSS is usually palletized and stacked. If the creep resistance of the HDSS is insufficient, deformation of the sack at the bottom of the pallet can occur. The pallet can then become unstable increasing the possibility of tipping over and product losses. A conventional HDSS typically has a three-layer film structure. One issue, however, is the desire to continually down-gauge the HDSS without compromising its strength and integrity. As a HDSS is down-gauged, the conventional three-layer film structure used in a HDSS can no longer provide balanced properties in toughness-creep strain. As such, there is a need in the art for multi-layer films that can withstand the rigors required of the HDSS and other applications.

SUMMARY

The present disclosure provides a multi-layer blown film suitable for a heavy duty shipping sack (HDSS). The multi-layer blown film of the present disclosure includes, among other things, a first skin layer, a second skin layer, a core layer, a first inner layer, and a second inner layer that together help to produce a down-gauged HDSS that does not compromise the integrity and the strength required for a HDSS.

The multi-layer blown film of the present disclosure includes a first skin layer and a second skin layer where at least one of the first skin layer and the second skin layer comprise from 80 to 100 weight percent (wt. %) of a linear low-density polyethylene (LLDPE). The LLDPE of at least one of the first skin layer and the second skin layer has a density from 0.910 to 0.935 g/cm$^3$ and a melt index ($I_2$, 2.16 kg, 190° C.) from 0.2 to 2 g/10 min. The LLDPE of at least one of the first skin layer and the second skin layer also has a melt index ratio ($I_{10}/I_2$, $I_{10}$, 10 kg, 190° C.) that meets the following equation: $I_{10}/I_2 \geq 7.0-1.2 \times \log(I_2)$. The LLDPE also has a zero-shear viscosity ratio (ZSVR) value ranging from 1.0 to 3.0. In addition, the LLDPE of at least one of the first skin layer and the second skin layer has a molecular weight distribution (MWD) ranging from 2.5 to 5.5 and a molecular weight comonomer distribution index (MWCDI) value that ranges from 0.9 to 10. In some embodiments, the first skin layer and the second skin layer comprise the LLDPE and have the same composition. In some embodiments, each of the first skin layer and the second skin layer comprises from 10 to 30 volume percent (vol. %) of the multi-layer blown film, the vol. % is based on a total volume of the multi-layer blown film.

The multi-layer blown film includes a core layer between the first skin layer and the second skin layer. The core layer comprises from 70 to 100 wt. % (alternatively, from 80 to 100 wt. %) of a second LLDPE having a density ranging from 0.910 to 0.935 g/cm$^3$, the wt. % based on a total weight of the core layer, and a melt index ranging from 0.2 to 2 g/10 min. In some embodiments, the second LLDPE of the core layer of the multi-layer blown film has a density from 0.915 to 0.925 g/cm$^3$. The second LLDPE of the core layer has a MWD ranging from 2.5 to 5.5, a MWCDI value from 0.9 to 10, and a melt index ratio ($I_{10}/I_2$) that meets the following equation: $I_{10}/I_2 \geq 7-1.2 \times \log(I_2)$. The ZSVR value of the second LLDPE of the core layer ranges from 1.0 to 3.0. In some embodiments, the core layer comprises from 10 to 40 vol. % of the multi-layer blown film, the vol. % is based on a total volume of the multi-layer blown film.

The multi-layer blown film includes a first inner layer and a second inner layer. Further, at least one of the first inner layer and the second inner layer comprises from 80 to 100 wt. % of a high-density polyethylene (HDPE). The HDPE has a density from 0.940 to 0.970 g/cm$^3$. In some embodiments, the first inner layer and the second inner layer comprise the HDPE and have the same composition. In some embodiments, each of the first inner layer and the second inner layer can comprises from 10 to 30 vol. % of the multi-layer blown film, the vol. % is based on a total volume of the multi-layer blown film.

In some embodiments, the multi-layer blown film has 10 to 80 vol. % of a combination of the LLDPE and the second LLDPE, the vol. % is based on total volume of the multi-layer blown film. The multi-layer blown film with a film thickness from 15 to 150 μm has a dart drop from 540 to 750 g as tested by method A of ASTM D1709, Aluminum dart head. For example, the multi-layer blown film with a film thickness of 100 μm has a dart drop from 540 to 750 g as tested by method A of ASTM D1709, Aluminum dart head. In some embodiments, the multi-layer blown film has a density from 0.925 g/cm$^3$ to 0.940 g/cm$^3$ when measured according to the Film Density Calculation provided in the Test Methods Section herein. In alternative embodiments, the multi-layer blown film has a density from 0.925 g/cm$^3$ to 0.935 g/cm$^3$ when measured according to the Film Density Calculation provided in the Test Methods Section herein. The multi-layer blown film has a creep strain from 10 to 40%, when measured according to the Creep Strain Method provided in the Test Method Section of this disclosure.

In some embodiments, the multi-layer blown film has five layers. In an additional embodiment, the multi-layer blown film has only five layers formed from the first skin layer, the second skin layer, the core layer, the first inner layer and the second inner layer, which together provide the five layers of the multi-layer blown film. The total thickness of the multi-layer blown film is from 15 to 150 μm. In some embodiments, the multi-layer blown film has a total thickness from 50 to 120 μm. A method of forming a multi-layer blown film includes the steps of preparing a first skin layer and a second skin layer, where at least one of the first skin layer and the second skin layer comprises a LLDPE having a density from 0.910 to 0.935 g/cm$^3$, a melt index from 0.2 to 2 g/10 min ($I_2$, 2.16 kg, 190° C.), a MWD from 2.5 to 5.5, a MWCDI value from 0.9 to 10, a melt index ratio that meets the following equation: $I_{10}/I_2 \geq 7.0-1.2 \times \log(I_2$, 2.16 kg, 190° C.), and a ZSVR value from 1.0 to 3.0; preparing a core layer between the first skin layer and the second skin layer, where the core layer comprises a second LLDPE, the second LLDPE having density from 0.910 to 0.935 g/cm$^3$, a melt index from 0.2 to 2 g/10 min (I$_2$, 2.16 kg, 190° C.), a MWD from 2.5 to 5.5, a MWCDI value from 0.9 to 10, a melt index ratio that meets the following equation: I$_{10}$/I$_2$≥7−1.2× log (I$_2$, 2.16 kg, 190° C.), and a ZSVR value from 1.0 to 3.0; preparing a first inner and a second inner layer, where at least one of the first inner layer and the second inner layer comprises a HDPE, where the HDPE has a density from 0.940 to 0.970 g/cm$^3$; and forming the multi-layer blown film from the first skin layer and the second skin layer, the core layer, the first inner layer and the second inner layer, where the multi-layer blown film having a film thickness of 100 μm has a dart drop from 540 to 750 g when tested with ASTM D1709, method A, Aluminum dart head; a creep strain from 10 to 40% when measured according to the Creep Strain Method provided in the Test Method Section of this disclosure; where the multi-layer blown film has a density from 0.925 to 0.940 g/cm$^3$ when measured according to the Film Density Calculation provided in the Test Methods Section herein. The multi-layer blown film can have a total thickness of 15 to 150 μm. In some embodiments, forming the multi-layer blown film is done by blown extrusion or co-extrusion.

DETAILED DESCRIPTION

The present disclosure provides a multi-layer blown film for a heavy duty shipping sack (HDSS). In various embodiment, the multi-layer blown film of the present disclosure can have five or more layers. For example, the multi-layer blown film of the present disclosure includes, among other things, a first skin layer, a second skin layer, a core layer, a first inner layer, and a second inner layer that together help to produce a down-gauged HDSS that does not compromise the required integrity and the strength of the HDSS. The multi-layer blown film of the present disclosure can also have six (6) layer, seven (7) layers or more.

As used herein, "core" layer, "skin" layer, and "inner" layer are merely identifiers used for convenience and should not be construed as a limitation on individual layers, their relative positions, or the laminated structure, unless otherwise specified herein.

Unless stated to the contrary, implicit from the context, or customary in the art, all parts and percentages herein are based on the total weight of the material (e.g., the core layer, as discussed herein) being discussed, all temperatures are in degree Celsius (° C.), and all test methods are current as of the filing date of this disclosure.

The term "composition," as used herein, refers to a mixture of materials that comprise the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), the term copolymer and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "comprising," "including," "having," and their derivatives, are not intended to exclude the presence of any additional component, step or procedure, whether or not the same is specifically disclosed. To avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The terms "polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. Nos. 8,916,667, 8,871,887, 8,822,601, 9,228,036, and 9,765,160, which are hereby incorporated by reference).

The term "LLDPE," includes both resin made using the traditional Ziegler-Natta catalyst systems as well as single-site catalysts, including, but not limited to, bis-metallocene catalysts (sometimes referred to as "m-LLDPE" or metallocene-LLDPE) and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,773,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342). The LLDPEs can be made via gas-phase, solution-phase or slurry polymerization or any combination thereof, using any type of reactor or reactor configuration known in the art.

The term "HDPE" refers to polyethylenes having densities greater than about 0.940 g/cm$^3$, which are generally prepared with Ziegler-Natta catalysts, chrome catalysts or single-site catalysts including, but not limited to, bis-metallocene catalysts and constrained geometry catalysts.

The term "multi-layer blown film" refers to a film having five (5) or more layers formed from the polymer compositions as provided herein. In addition to multi-layer blown films, the present disclosure can allow for, without limitation, multi-layer sheets, laminated films, multi-layer rigid containers, multi-layer pipes, and multi-layer coated substrates.

All densities provided herein are measured in accordance with ASTM D-792, unless otherwise indicated. All melt index ($I_2$) values provided herein are measured in accordance with ASTM D1238, Method B, at 190° C. at 2.16 kg. All melt index ($I_{10}$) values provided herein are measured in accordance with ASTM D1238, Method B, at 190° C. at 10 kg. All melt index ($I_{21}$) values provided herein are measured in accordance with ASTM D1238, Method B, at 190° C. at 21.6 kg. The values are reported in g/10 min, which corresponds to grams eluted per 10 minutes. Techniques for measuring the weight average molecular weight ($M_w$) and the number average molecular weight ($M_n$) are known in the art and are measured according to the procedure provided in the Test Methods Section herein. The molecular weighted comonomer distribution index (MWCDI) values provided herein are measured according to the procedure provided in the Test Methods Section herein. The zero-shear viscosity ratio (ZSVR) values provided herein are measured according to the procedure provided in the Test Methods Section herein. Additional properties and test methods are described further herein.

First Skin Layer and Second Skin Layer

The multi-layer blown film of the present disclosure includes a first skin layer and a second skin layer that each comprise a linear low density polyethylene (LLDPE) or a blend of the LLDPE and a low density polyethylene (LDPE), as provided herein. In various embodiments, each of the first skin layer and the second skin layer comprises from 10 to 30 volume percent (vol. %) of the multi-layer blown film, where the vol. % is based on a total volume of the multi-layer blown film. In some embodiments, each of the first skin layer and the second skin layer comprises from 10 to 25 vol. %, and in alternative embodiments from 10 to 20 vol. %, where the vol. % is based on a total volume of the multi-layer blown film.

In some embodiments, at least one of the first skin layer and the second skin layer can comprise 80 to 100 wt. % of the LLDPE, where the LLDPE has a density from 0.910 to 0.935 g/cm³ and a melt index ($I_2$, 2.16 kg, 190° C.) in the range from 0.2 to 2 g/10 min, as described herein, and 20 to 0 wt. % of the LDPE, as described herein, where the wt. % is based on a total weight of at least one of the first skin layer and the second skin layer. In some embodiments, at least one of the first skin layer and the second skin layer comprises 90 to 95 wt. % of the LLDPE and 10 to 5 wt. % of the LDPE, as described herein, where the wt. % is based on a total weight of at least one of the first skin layer and the second skin layer. In alternative embodiments, at least one of the first skin layer and the second skin layer comprises 95 to 100 wt. % of the LLDPE and 5 to 0 wt. % of the LDPE, as described herein, where the wt. % is based on a total weight of at least one of the first skin layer and the second skin layer. In some embodiments, at least one of the first skin layer and the second skin layer consists essentially of 80 to 100 wt. % of the LLDPE having a density from 0.910 to 0.935 g/cm³ and a melt index ($I_2$, 2.16 kg, 190° C.) in the range of 0.2 to 2 g/10 min, as described herein, and optionally 20 to 0 wt. % of the LDPE, as described herein, where the wt. % is based on a total weight of at least one of the first skin layer and the second skin layer. In various embodiments, at least one of the first skin layer and the second skin layer can include additives, as described herein.

The LLDPE of at least one of the first skin layer and the second skin layer also has a molecular weight distribution (MWD) ranging from 2.5 to 5.5 and a molecular weight comonomer distribution index (MWCDI) value from 0.9 to 10. The LLDPE of at least one of the first skin layer and the second skin layer also has a melt index ratio ($I_{10}/I_2$) that meets the following equation: $I_{10}/I_2 \geq 7 - 1.2 \times \log(I_2)$. In some embodiments, the LLDPE of at least one of the first skin layer and the second skin layer has a melt index ratio ($I_{10}/I_2$) from 7.0 to 9.2, as described herein; all individual values and subranges from 7 to 9.2 are included and disclosed herein. For example, the LLDPE can have a melt index ratio ($I_{10}/I_2$) from a lower limit of 7, 7.1, 7.2, 7.3, 7.5, 7.9, or 8.5 to an upper limit of 8.6, 8.7, 8.8, 8.9, 9, or 9.2. In some embodiments, the LLDPE can have melt index ratio ($I_{21}/I_2$) from 25 to 40, as described herein; all individual values and subranges from 25 to 40 are included and disclosed herein. For example, the LLDPE can have a melt index ratio ($I_{21}/I_2$) from a lower limit of 25, 27, 30, 32, or 34 to an upper limit of 33, 35, 37, 39, or 40.

The LLDPE of at least one of the first skin layer and the second skin layer also has a ZSVR value ranging from 1.0 to 3.0. In some embodiments, the ZSVR value of the LLDPE of at least one of the first skin layer and the second skin layer is from 1.2 to 3.0 and, in other embodiments, from 1.5 to 3.0. In some embodiments, the ZSVR value of the LLDPE is from 1.2 to 2.5, in alternative embodiments from 1.5 to 2.5, in yet another alternative embodiment, from 1.2 to 2.0, in other embodiments, from 1.2 to 3.0.

Core Layer

In various embodiments, the multi-layer blown film includes a core layer between the first skin layer and the second skin layer. In some embodiments, the multi-layer blown film includes the core layer between the first inner layer and the second inner layer. In various embodiments, the core layer is formed from a single contiguous (e.g., discrete) layer of the core polymer and is not formed using two or more contiguous layers of the core polymer. In an alternative embodiment, the core layer can be formed of two or more layers of the core polymer.

In various embodiments, the core layer comprises from 10 to 40 volume percent (vol. %) of the multi-layer blown film, the vol. % is based on a total volume of the multi-layer blown film. In some embodiments, the core layer comprises from 15 to 35 vol. %, in alternative embodiment, from 17 to 30 vol. %, and in yet another alternative embodiment, from 20 to 30 vol. % of the multi-layer blown film, the vol. % is based on a total volume of the multi-layer blown film.

The core layer comprises a second linear low-density polyethylene (LLDPE) having a density from 0.910 to 0.935 g/cm³ and a melt index ($I_2$, 2.16 kg, 190° C.) from 0.2 to 2 g/10 min, as measured in accordance with ASTM D-1238 and described in the Test Methods Section of this disclosure. The second LLDPE of the core layer can be the same or different than the LLDPE of the first or second skin layer. In some embodiments, the second LLDPE has a density from 0.910 to 0.930 g/cm³ and in alternative embodiments, from 0.915 to 0.925 g/cm³. In some embodiments, the core layer can comprise 70 to 100 weight percent (wt. %) of the second LLDPE and 30 to 0 wt. % of a low density polyethylene (LDPE), high density polyethylene (HDPE), additives, and/or a combination thereof, where the wt. % is based on a total weight of the core layer. In some embodiments, the core layer can comprise 80 to 100 wt. % of the second LLDPE and 20 to 0 wt. % of a LDPE, HDPE, additives, and/or combinations thereof, where the wt. % is based on the total weight of the core layer. In alternative embodiments, the core layer can comprise 90 to 100 wt. % of the second LLDPE and 10 to 0 wt. % of a LDPE, HDPE, additives, and/or combinations thereof, where the wt. % is based on the total weight of the core layer.

The second LLDPE also has a molecular weight comonomer distribution index (MWCDI) value from 0.9 to 10. For example, the second LLDPE can have a MWCDI value from a lower limit of 0.9, 1.0, 1.1, 1.2, 1.3, 1.4, 1.5, 2, or 3, to an upper limit of 4, 5, 6, 7, 8, 9, or 10.

The second LLDPE has a melt index ratio ($I_{10}/I_2$) that meets the following equation: $I_{10}/I_2 \geq 7-1.2 \times \log(I_2)$. In some embodiments, the second LLDPE has a melt index ratio ($I_{10}/I_2$) from 7 to 9.2; all individual values and subranges from 7 to 9.2 are included and disclosed herein. For example, the second LLDPE can have a melt index ratio ($I_{10}/I_2$) from a lower limit of 7, 7.1, 7.2, 7.3, 7.5, 7.9, or 8.5 to an upper limit of 8.6, 8.7, 8.8, 8.9, 9, or 9.2. In some embodiments, the second LLDPE has a melt index ratio ($I_{21}/I_2$) from 25 to 40; all individual values and subranges from 25 to 40 are included and disclosed herein. For example, the second LLDPE can have a melt index ratio ($I_{21}/I_2$) from a lower limit of 25, 27, 30, 32, or 34 to an upper limit of 33, 35, 37, 39, or 40. The melt index values for $I_2$, $I_{10}$, and $I_{21}$ are measured in accordance with ASTM D-1238 as described in the Test Methods Section of this disclosure.

The second LLDPE has a molecular weight distribution (MWD), defined as weight average molecular weight divided by number average molecular weight (Mw/Mn) from 2.5 to 5.5, in alternative embodiments from 3.0 to 4.5, in yet another alternative embodiment from 3.0 to 4.0.

The zero shear viscosity ratio (ZSVR) value of the second LLDPE ranges from 1.0 to 3.0. In some embodiments, the ZSVR value of the second LLDPE ranges from 1.2 to 3.0 and, in other embodiments, from 1.5 to 3.0. In some embodiments, the ZSVR value of the second LLDPE ranges from 1.2 to 2.5, in alternative embodiments from 1.5 to 2.5, in yet another alternative embodiment, from 1.2 to 2.0, in other embodiments, from 1.2 to 3.0.

Examples of commercially available second LLDPEs that can be used in the core layer are ethylene/alpha-olefin copolymers available from Dow, Inc. under the tradename "INNATE™" ethylene/1-octene enhanced polyethylene and "ELITE™" ethylene/alpha-olefin copolymers. Another example of the second LLDPE includes "EXCEED™ XP" available from ExxonMobil Chemical.

LDPE

In some embodiments, the LDPE used in any one of the first skin layer, the second skin layer and/or the core layer can have a melt index ($I_2$, 2.16 kg, 190° C.) from 0.1 to 9 g/10 min, in alternative embodiments from 0.2 to 6 g/10 min, in yet another alternative embodiment from 0.2 to 4 g/10 min, in other embodiments from 0.25 to 2 g/10 min. Melt index is inversely proportional to the weight average molecular weight of the polymer. Thus, the higher the weight average molecular weight, the lower the melt index, although the relationship is not linear. The LDPE can have a density from 0.917 to 0.935 g/cm³. In some embodiments, the LDPE has a density from 0.917 to 0.925 g/cm³.

The LDPE of the present disclosure can be made using a high pressure free radical manufacturing process known to one of ordinary skill in the art. The LDPE's are typically homopolymers, but may contain a small amount of comonomer (less than one percent (1%) by weight units derived from comonomers). Commercially available examples of LDPEs that can be used in the any one of the first skin layer, the second skin layer and/or the core layer, include, for example, those available from Dow, Inc. as DOW™ LDPE 150E, 303E, 320E, 310E, 450E, or under the tradename "AGILITY™," and many other grades, and from Lyondell-Basell Industries under the tradenames of "LUPOLEN" and "PETROTHENE".

First Inner Layer and Second Inner Layer

The multi-layer blown film includes a first inner layer and a second inner layer positioned between the first skin layer and the second skin layer. In various embodiments, at least one of the first inner layer and the second inner layer comprise a high-density polyethylene (HDPE). In various embodiments, each of the first inner layer and the second inner layer comprises from 10 to 30 volume percent (vol. %) of the multi-layer blown film, where the vol. % is based on a total volume of the multi-layer blown film. In some embodiments, each of the first inner layer and the second inner layer comprises from 10 to 25 vol. %, and in alternative embodiments from 15 to 20 vol. %.

In some embodiments, at least one of the first inner layer and the second inner layer can comprise 80 to 100 wt. % of an HDPE, where the wt. % is based on a total weight of at least one of the first inner layer and the second inner layer, and in alternative embodiments 95 to 99 wt. % of HDPE. All individual values and subranges from 80 to 99.5 wt. % are included and disclosed herein; for example, at least one of the first inner layer and the second layer can comprise from 94 to 99.5 wt. % or from 97 to 99 wt. % of the HDPE. The remaining wt. % of each of the first inner layer and the second inner layer is made up of LLDPE, LDPE, additives, and/or combinations thereof, as described herein. In some embodiments, at least one of the first inner layer and the second inner layer can consist essentially of 80 to 100 wt. % of the HDPE and optionally 20 to 0 wt. % of LLDPE, LDPE, additives, and/or combinations thereof, as described herein, where the wt. % is based on a total weight of at least one of the first inner layer and the second inner layer.

The HDPE has a density from 0.940 to 0.970 g/cm³, in some embodiments a density from 0.942 to 0.965 g/cm³, in alternative embodiments from 0.944 to 0.965 g/cm³, in yet another alternative embodiment from 0.950 to 0.965 g/cm³. In some embodiments, the HDPE is a copolymer of ethylene having a density of from 0.945 to 0.965 g/cm³.

In embodiments, the HDPE has a melt index ($I_2$, 2.16 kg, 190° C.) from 0.01 to 10 g/10 min. In some embodiments, the HDPE has a melt index ($I_2$, 2.16 kg, 190° C.) from 0.2 to 10 g/10 min, in alternative embodiments from 0.2 to 2 g/10 min.

The HDPE polymers used in this disclosure are well known in the art and can be prepared by known techniques such as gas phase, solution, or slurry polymerization with Ziegler-Nana catalysts, chrome catalysts or single-site catalysts including, but not limited to, bis-metallocene catalysts and constrained geometry catalysts.

The HDPE can be a unimodal or multimodal (e.g., bimodal) as measured by gel permeation chromatography (GPC). A "unimodal HDPE" is a HDPE polymer having a MWD (measured by GPC) that does not exhibit multiple component polymers, that is, no humps, shoulders or tails exist or are substantially discernible in the GPC curve, and the degree of separation is zero or substantially close to zero. A "multimodal HDPE" exhibits multiple components (e.g., humps, shoulders, tails, discernible peaks) in the GPC curve.

Examples of commercially available HDPEs that can be used in the first inner layer and/or the second inner layer include, for example, those available from Dow, Inc. under the tradename "DMDH 6400" and "Petrothene LR765701", available from LyondellBasell Industries.

As noted above, the multi-layer blown film of the present disclosure can have five or more layers that can include, among other things, a first skin layer, a second skin layer, a core layer, a first inner layer, and a second inner layer that together help to produce a down-gauged HDSS that does not compromise the required integrity and the strength of the HDSS. Also as previously noted, the multi-layer blown film of the present disclosure can also have six (6) layers, seven (7) layers or more. For the above mentioned layers it is possible that the multi-layer blown film can contain and/or be formed completely from a "post-consumer resin" (or "PCR"). This can include incorporating (e.g., blending) one or more of a PCR into one or more of the layers identified above (the layer is formed using less than 100 wt. % PCR) and/or forming one or more of the layers identified above completely from a PCR (the layer is formed from 100 wt. % PCR). As known in the art, PCR is a polymeric material that includes materials previously used in a consumer or industry application. The PCR may include one or more of a low density polyethylene, linear low density polyethylene, high density polyethylene, a polypropylene, a polyester, a poly (vinyl chloride), a polystyrene, an acrylonitrile butadiene styrene, a polyamide, an ethylene vinyl alcohol, an ethylene vinyl acetate, or a poly-vinyl chloride. As noted above, the PCR can be either be incorporated with and/or form any of the skin layer, an inner layer and/or the core layer of the multi-layer blown film of the present disclosure. In other words, the PCR could be in and/or form any one of the layers or in multiple layers of the multi-layer film. Preferably, the PCR could form or be incorporated in the core layer, which may help to better preserve the properties of the multi-layer film. When used in the multi-layer blown film of the present disclosure the PCR can account for 10-80 weight percent (wt. %) of the multi-layer film (weight percent based on the total weight of the multi-layer blown film).

Forming Multi-Layer Blown Film

Multi-layer blown films may generally be produced using techniques known to those of skill in the art based on the teachings herein. For example, the multi-layer blown film may be produced by coextrusion. The technique of multi-layer blown film extrusion is well known for the production of thin plastic films. Suitable multi-layer blown film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192.

The formation of coextruded multi-layer blown films is known in the art and applicable to the present disclosure. The term "coextrusion" refers to the process of extruding two or more materials through a single die with two or more orifices arranged such that the extrudates merge together into a laminar structure, in some embodiments the coextrusion process is done before chilling or quenching. Coextrusion systems for making multi-layer blown films employ at least two extruders feeding a common die assembly. The number of extruders is dependent upon the number of different materials comprising the coextruded film. For each different material, a different extruder is used. Thus, a five-layer coextrusion may require up to five extruders although less may be used if two or more of the layers are made of the same material.

Adjacent layers of the multi-layer blown film are optionally directly adhered to each other, or alternatively may have an adhesive, tie or other layer between them, particularly for the purpose of achieving adhesion there between. Constituents of the layers are selected to achieve the desired purpose.

The multi-layer blown films may be used for a variety of causes, such as, consumer and industrial product liners, sheet and tubing, agricultural films, greenhouse films, construction film, heavy duty shipping sack film and the like as are known in the art. For example, the multi-layer blown film of the present disclosure is used in forming a heavy duty shipping sack film.

Heavy Duty Shipping Sack Film

For heavy duty shipping sack film, the multi-layer blown film of the present disclosure is from 15 to 150 µm thick. In other embodiments, the multi-layer blown film has a thickness from 15 to 100 µm. In other embodiments, the multi-layer blown film has a thickness from 50 to 120 µm. In some embodiments, the multi-layer blown film has a thickness from 50 to 140 µm, in another example from 70 to 140 µm, in another example from 100 to 140 µm, in another example from 70 to 120 µm, in another example 70 to 100 µm, in alternative embodiments, the multi-layer blown film has a thickness from 75 to 110 µm, in yet another alternative embodiment, the multi-layer blown film has a thickness from 80 to 100 µm. The multi-layer blown film of the present disclosure has a density from 0.925 to 0.940 g/cm$^3$, when measured according to the Film Density Calculation provided in the Test Methods Section herein. In some embodiments, the multi-layer blown film has a density from 0.925 g/cm$^3$ to 0.935 g/cm$^3$, when measured according to the Film Density Calculation provided in the Test Methods Section herein. In alternative embodiments, the multi-layer blown film has a density from 0.925 g/cm$^3$ to 0.931 g/cm$^3$, when measured according to the Film Density Calculation provided in the Test Methods Section herein. Such multi-layer blown films help to produce a down-gauged heavy duty shipping sack that does not compromise the integrity and the strength of the film.

In addition to the other physical properties discussed herein with respect to the multi-layer blown film structures, the multi-layer blown film structure typically exhibits a dart drop of at least 540 g and often much higher at a thickness ranging from 15 to 150 µm. In some embodiments, the multi-layer blown film having a thickness of 100 µm has a dart drop of at least 540 g. In some embodiments, the multi-layer blown film having a thickness of 100 µm has a dart drop equal to or more than 550 g. In some embodiments, the multi-layer blown film having a thickness of 100 µm has a dart drop equal to or more than 570 g. In other embodiments, the multi-layer blown film having a thickness of 100 µm has a dart drop equal to or more than 650 g. Yet in other embodiments, the multi-layer blown film having a thickness of 100 µm has a dart drop equal to or more than 700 g. For instance, the dart drop of the multi-layer blown film having a thickness of 100 µm of the present disclosure ranges from 540 to 750 g or 550 to 750 g, when measured according to the procedures of method A of ASTM D1709, Aluminum dart head.

The multi-layer blown film structure typically exhibits a creep strain equal to or less than 40%, according to measurement description in the Creep Strain Method provided in the Test Methods Section of this disclosure. In some embodiments, the multi-layer blown film has a creep strain equal to or less than 35%. In some embodiments, the multi-layer blown film has a creep strain equal to or less than 30%. In other embodiments, the multi-layer blown film has a creep strain equal to or less than 25%. Yet in other embodiments, the multi-layer blown film has a creep strain equal to or less than 20%. For instance, the creep strain of the multi-layer blown film of the present disclosure ranges from 10 to 45%.

The multi-layer blown film has a 2% Secant Modulus from 300 to 600 Mpa in the machine direction (MD) and from 350 to 700 Mpa in the cross direction (CD), as measured in accordance with ASTM D882. In some embodiments, the multi-layer blown film has a 2% Secant Modulus from 350 to 550 Mpa in MD and from 350 to 600 Mpa in CD. In alternative embodiments, the multi-layer blown film has a 2% Secant Modulus from 370 to 530 Mpa in MD and from 380 to 600 Mpa in CD.

The multi-layer blown film has an Elmendorf tear from 300 to 1500 gf in MD and from 600 to 2500 gf in CD, as measured in accordance with ASTM D1922 at a thickness ranging from 15 to 150 µm. In some embodiments, the multi-layer blown film has an Elmendorf tear from 350 to 1500 gf in MD and 650 to 2400 gf in CD. In other embodiments, the multi-layer blown film has an Elmendorf tear from 400 to 1500 gf in MD and 700 to 2400 gf in CD.

In addition, the multi-layer blown film of this disclosure can be produced at low extruder back pressures, as compared to other known systems (e.g., systems that produced the Comparative Example films). One recognizes better processability by the lower back pressure which allows for higher output rates. That is, all processing parameters being equal, the selection and composition of the multi-layer blown film disclosed herein allows for operation at a lower pressure as compared to other known systems. Further, the selection and composition of the multi-layer blown film help to produce a down-gauged multi-layer blown film that does not compromise the required integrity and the strength of multi-layer blown film.

Additives

Additives are optionally included in each layer of the multi-layer blown film. Additives are well known within the skill in the art. Such additives include, for instance, stabilizers including free radical inhibitors and ultraviolet (UV) stabilizers, neutralizes, nucleating agents, slip agents, antiblock agents, pigments, antistatic agents, clarifiers, waxes, resins, fillers such as silica and carbon black, calcium carbonate, titanium dioxide, and other additives within the skill in the art used in combination or alone. Effective amounts are known in the art and depend on parameters of the polymers in the composition and conditions to which they are exposed. In some embodiments, additives may each individually be present in an amount of about 0.01 to about 50 wt. %, or about 0.1 to about 15 wt. %, or from 1 to 10 wt. %, based on total weight of the film layer.

Any additive useful for the multi-layer blown film may be provided separately or together with other additive(s) of the same or a different type in a pre-blended masterbatch, where the target concentration of the additive is reached by combining each neat additive in an appropriate amount to make the final composition.

As is known to one of skill in the art, antiblock additives are additives that when added to polymer films minimize the tendency of the film to stick to another film or itself during manufacturing, transport and storage. Typical materials used as antiblocks include silica, talc, clay particles, and other substances known to one of ordinary skill in the art.

As is known to one of skill in the art, slip additives are additives that when added to polymer films lower the coefficient of friction of the film. Typical materials used as slip agents include erucamide, oleamide, and other substances known to one of ordinary skill in the art.

Examples

In the Examples, various terms and designations for materials were used including, for example, the following:

TABLE 1

| List of materials | |
|---|---|
| Material | Description/Source |
| INNATE ™ ST50 (ST 50) Dow, Inc. (DOW) | LLDPE |
| EXCEED ™ 1018 ExxonMobil Chemical | LLDPE |
| ENABLE ™ 2005 ExxonMobil Chemical | LLDPE |
| DMDH 6400 (DOW) | HDPE |
| AGILITY ™ 1200 (DOW) | LDPE |

Condition all multi-layer blown films of the Examples and Comparative Examples for at least 40 hours at 23 Celsius (° C.) (+/−2° C.) and 50% relative humidity (R.H.) (+/−10%), as per ASTM standards. Standard testing conditions are 23° C. (+/−2° C.) and 50% R.H (+/−10%), as per ASTM standards.

Test Methods Section

Density Measurement

Ethylene/alpha-olefin interpolymers for density measurements were prepared according to ASTM D 4703-10. Samples were pressed at 374° F. (190° C.), for five minutes, at 10,000 psi (68 Mpa). The temperature was maintained at 374° F. (190° C.) for the above five minutes, and then the pressure was increased to 30,000 psi (207 Mpa) for three minutes. This was followed by a one minute hold at 70° F. (21° C.) and 30,000 psi (207 Mpa). Measurements were made within one hour of sample pressing using ASTM D792-08, Method B.

Melt Index

Melt index ($I_2$) for the ethylene/alpha-olefin interpolymers is measured in accordance with ASTM D1238, Method B, at 190° C. at 2.16 kg. Similarly, melt index (ho) for the ethylene/alpha-olefin interpolymers is measured in accordance with ASTM D1238, Method B, at 190° C. at 10 kg. Melt index ($I_{21}$) for the ethylene/alpha-olefin interpolymers is measured in accordance with ASTM D1238, Method B, at 190° C. at 21.6 kg. The values are reported in g/10 min, which corresponds to grams eluted per 10 minutes.

ASTM D882 MD and CD, 1% and 2% Secant Modulus

The multi-layer blown film MD (Machine Direction) and CD (Cross Direction) secant modulus values are determined in accordance with ASTM D882 using a gauge length of 4 inches and a crosshead speed of 2 inches/min. Secant modulus value is reported as an average of five measurements in megaPascals (Mpa).

ASTM D1709, Method A, Dart Drop

The film Dart Drop test determines the energy that causes a plastic film to fail, under specified conditions of impact by a free falling dart. The test result is the energy, expressed in terms of the weight of the missile falling from a specified height, which would result in the failure of 50% of the specimens tested. The test method for the Dart Drop Impact strength was conducted in accordance with ASTM D1709, method A, Aluminum dart head.

ASTM D1922 MD (Machine Direction) and CD (Cross Direction) Elmendorf Tear Type B The Elmendorf Tear test determines the average force to propagate tearing through a specified length of plastic film or non-rigid sheeting, after the tear has been started, using an Elmendorf-type tearing tester. The test method for Elmendorf Tear test was conducted in accordance with ASTM D1922.

Creep Strain Method—Single Point Creep Measurement

Single Point Creep samples are conditioned in accordance with ASTM D618. The evaluation was conducted as follows. Samples approximately 1 in. wide and 8 in. in length are cut from the film in the CD orientation. Upper and lower rubber faced clamps are placed in a jig that ensure the gauge lengths of the samples are precise and repeatable at 100 millimeters (mm) in length. The clamped samples are thermally equilibrated inside a pre-heated oven at 50° C. for 30 min. The clamped samples are then loaded onto a testing frame. To ensure the lower clamp is level, an attached pointer is used to read off the initial gauge mark on a scale attached to the fixed portion of the frame. A steel or lead shot including a holder of the weight (1.51 kg including the holder is used for 100-110 µm thick films) is then added to the lower grip. Once all samples are loaded, the oven door is closed at 50° C. and the samples are allowed to creep under uniaxial tension for the prescribed time (15 hours). After 15 hours at 50° C., the position of the pointer is read to give the final gauge mark. The creep strain is given by the extension (e.g., final gauge mark—initial gauge mark) divided by the initial gauge length, typically expressed as a percentage. This method is performed three times and the creep strain is then averaged.

Conventional Gel Permeation Chromatography (Conventional GPC) and Molecular Weighted Comonomer Distribution Index (MWCDI)

The evaluation for conventional GPC and MWCDI was conducted as follows. The chromatographic system consists of a PolymerChar GPC-IR high temperature GPC chromatograph equipped with an internal IR5 infra-red detector (IR5). The autosampler oven compartment is set at 160° C. and the column compartment is set at 150° C. The columns used are 4 Agilent "Mixed A" 30 centimeters (cm) 20-micron linear mixed-bed columns. The chromatographic solvent used is 1,2,4 trichlorobenzene and contains 200 parts per million (ppm) of butylated hydroxytoluene (BHT). The solvent source is nitrogen sparged. The injection volume used is 200 microliters and the flow rate is 1.0 milliliter/minute.

The GPC column set is calibrated with at least 20 narrow molecular weight distribution polystyrene standards with molecular weights ranging from 580 to 8,400,000 g/mol and are arranged in 6 "cocktail" mixtures with at least a decade of separation between individual molecular weights. The standards are obtained from Agilent Technologies. The polystyrene standards are prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards are dissolved at 80° C. with gentle agitation for 30 minutes. The polystyrene standard peak molecular weights are converted to ethylene/alpha-olefin interpolymer molecular weights using the following equation (as described in Williams and Ward, J. Polym. Sci., Polym. Let., 6, 621 (1968)):

$$M_{polyethylene} = A \times (M_{polystyrene})^B \quad \text{(Eq. 1)}$$

where M is the molecular weight, A has a value of 0.4315 and B is equal to 1.0.

A fifth order polynomial is used to fit the respective ethylene/alpha-olefin interpolymer-equivalent calibration points. A small adjustment to A (from approximately 0.39 to 0.44) is made to correct for column resolution and band-broadening effects such that the National Institute of Standard and Technology (NIST) standard NBS 1475 is obtained at a molecular weight of 52,000 g/mol.

The total plate count of the GPC column set is performed with Eicosane (prepared at 0.04 g in 50 milliliters of TCB and dissolved for 20 minutes with gentle agitation). The plate count (Equation 2) and symmetry (Equation 3) are measured on a 200 microliter injection according to the following equations:

$$\text{Plate Count} = 5.54 \times \left( \frac{RV_{Peak\ Max}}{\text{Peak Width at half height}} \right)^2 \quad \text{(Eq. 2)}$$

where RV is the retention volume in milliliters, the peak width is in milliliters, the Peak Max is the maximum height of the peak, and half height is one half of the height of the peak maximum.

$$\text{Symmetry} = \left( \frac{\text{Rear Peak } RV_{one\ tenth\ height} - RV_{Peak\ max}}{RV_{Peak\ max} - \text{Front Peak } RV_{one\ tenth\ height}} \right) \quad \text{(Eq. 3)}$$

where RV is the retention volume in milliliters and the peak width is in milliliters, Peak max is the maximum position of the peak, one tenth height is one tenth of the height of the peak maximum, and where rear peak refers to the peak tail at later retention volumes than the Peak max and where front peak refers to the peak front at earlier retention volumes than the Peak max. The plate count for the chromatographic system should be greater than 22,000 and symmetry should be between 0.98 and 1.22.

The samples are prepared in a semi-automatic manner with the PolymerChar "Instrument Control" Software, where the samples are weight-targeted at 2 mg/ml, and the solvent (contained 200 ppm BHT) is added to a pre nitrogen-sparged septa-capped vial, via the PolymerChar high temperature autosampler. The samples are dissolved for 3 hours at 160° C. under "low speed" shaking.

The calculations of $M_{n(GPC)}$, $M_{w(GPC)}$, and $M_{z(GPC)}$ are based on GPC results using the internal IR5 detector (measurement channel) of the PolymerChar GPC-IR chromatograph according to Equations 4a-c, using PolymerChar GPCOne software, the baseline-subtracted IR chromatogram at each equally-spaced data collection point i ($IR_i$) and the ethylene/alpha-olefin interpolymer equivalent molecular weight obtained from the narrow standard calibration curve for the point i ($M_{polyethylene,i}$ in g/mol) from Equation 1. Subsequently, a GPC molecular weight distribution (GPC-MWD) plot ($wt_{GPC}$(log MW) vs. log MW plot, where $wt_{GPC}$(log MW) is the weight fraction of the interpolymer molecules with a molecular weight of log MW) can be obtained. Molecular weight is in g/mol and $wt_{GPC}$(log MW) follows the Equation 4.

$$\int wt_{GPC}(\log MW)d \log MW = 1.00 \quad \text{(Eq. 4)}$$

Number-average molecular weight $M_{n(GPC)}$, weight-average molecular weight $M_{w(GPC)}$ and z-average molecular weight $M_{z(GPC)}$ can be calculated as the following equations.

$$Mn_{(GPC)} = \frac{\sum_i IR_i}{\sum_i (IR_i / M_{polyethylene,i})} \quad \text{(Eq. 4a)}$$

$$Mw_{(GPC)} = \frac{\sum_{i}^{i}(IR_i * M_{polyethylene,i})}{\sum_{i} IR_i} \quad \text{(Eq. 4b)}$$

$$Mz_{(GPC)} = \frac{\sum_{i}^{i}(IR_i * M_{polyethylene,i}^2)}{\sum_{i}(IR_i * M_{polyethylene,i})} \quad \text{(Eq. 4c)}$$

In order to monitor the deviations over time, a flow rate marker (decane) is introduced into each sample via a micropump controlled with the PolymerChar GPC-IR system. This flow rate marker (FM) is used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 5. Processing of the flow marker peak is done via the PolymerChar GPCOne Software. Acceptable flow rate correction is such that the effective flowrate should be within 0.5% of the nominal flowrate.

Flow rate$_{effective}$=Flow rate$_{nominal}$×(RV(FM$_{calibrated}$)/ RV(FM$_{sample}$)) Eq. 5

A calibration for the IR5 detector rationing is performed using at least eight ethylene/alpha-olefin interpolymer standards (one polyethylene homopolymer and seven ethylene/octene copolymers) of known short chain branching (SCB) frequency (measured by the 13C NMR Method), ranging from homopolymer (0 SCB/1000 total C) to approximately 50 SCB/1000 total C, where total C=carbons in backbone+carbons in branches. Each standard has a weight-average molecular weight from 36,000 g/mol to 126,000 g/mol, as determined by GPC. Each standard has a molecular weight distribution (Mw(GPC)/Mn(GPC)) from 2.0 to 2.5, as determined by GPC. The "IR5 Area Ratio (or "IR5 Methyl Channel Area/IR5 Measurement Channel Area")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) is calculated for each of the "SCB" standards. A linear fit of the SCB frequency versus the "IR5 Area Ratio" is constructed in the form of the following equation:

SCB/1000 total C=$A_0$+[$A_1$×(IR5$_{Methyl\ Channel\ Area}$/ IR5$_{Measurement\ Channel\ Area}$)] (Eq. 6)

where $A_0$ is the SCB/1000 total C intercept at an "IR5 Area Ratio" of zero, and $A_1$ is the slope of the SCB/1000 total C versus "IR5 Area Ratio" and represents the increase in the SCB/1000 total C as a function of "IR5 Area Ratio."

A series of linear baseline-subtracted chromatographic heights for the chromatogram generated by the "IR5 methyl channel sensor" are established as a function of column elution volume, to generate a baseline-corrected chromatogram (methyl channel). A series of linear baseline-subtracted chromatographic heights for the chromatogram generated by the "IR5 measurement channel" are established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" is calculated at each column elution volume index (each equally-spaced index, representing 1 data point per second at 1 milliliter/min elution) across the sample integration bounds. The "IR5 Height Ratio" is multiplied by the coefficient A1, and the coefficient A0 is added to this result, to produce the predicted SCB frequency of the sample. The result is converted into mole percent comonomer as follows in Equation 7:

Mole Percent Comonomer={$SCB_f$/[$SCB_f$+((1000−$SCB_f$*Length of comonomer)/2)]}*100 (Eq. 7)

where "$SCB_f$" is the "SCB per 1000 total C", and the "Length of comonomer" is the number of carbons of the comonomer, e.g. 8 for octene, 6 for hexene, and so forth.

Each elution volume index is converted to a molecular weight value (Mwi) using the method of Williams and Ward (described herein; Equation 1). The "Mole Percent Comonomer" is plotted as a function of lg(Mwi), and the slope is calculated between Mwi of 15,000 and Mwi of 150,000 g/mol (end group corrections on chain ends are omitted for this calculation). Linear regression is used to calculate the slope between, and including, Mwi from 15,000 to 150,000 g/mol, where the height of the concentration chromatogram is at least 10% of the peak height of the chromatogram. This slope is defined as the molecular weighted comonomer distribution index (MWCDI).

Zero-Shear Viscosity Ratio (ZSVR)

The zero-shear viscosity ratio is defined as the ratio of the zero-shear viscosity (ZSV) of the branched polyethylene material ($\eta_{0B}$) in Pa-sec to the ZSV of a linear polyethylene material ($\eta_{0L}$) in Pa-s (see references below) at the equivalent weight average molecular weight as measured by conventional GPC ($M_{w(GPC)}$), according to the following Equation:

$$ZSVR = \frac{\eta_{0B}}{\eta_{0L}} = \frac{\eta_{0B}}{2.29 \times 10^{-15} \times (M_{w(GPC)})^{3.65}} \quad \text{(Eq. 8)}$$

The ZSV value of the branched polyethylene material ($\eta_{0B}$) is obtained from a creep test, at 190° C., via the method described below. The $M_{w(GPC)}$ value is determined by the conventional GPC method (Equation 4b), as discussed herein. The correlation between the ZSV of the linear polyethylene and its $M_{w(GPC)}$ is established based on a series of linear polyethylene reference materials. A description for the ZSV-$M_{w(GPC)}$ relationship can be found in Karjala et al., *Detection of Low Levels of Long-Chain Branching in Polyolefins*, Annual Technical Conference—Society of Plastics Engineers (2008), 66th, p. 887-891 and Karjala et al., *Detection of Low Levels of Long-Chain Branching in Polydisperse Polyethylene Materials*, J. Appl. Polym. Sci., 119, 636-646 (2011).

Creep Melt Rheology

The ZSV value of the branched polyethylene material ($\eta_{0B}$) is obtained from a constant stress rheometer creep test at 190° C. in a nitrogen environment using a DHR, TA Instrument. The samples are subjected to flow between two 25 mm diameter plate fixtures positioned parallel to each other. The samples are prepared by compression molding pellets of the interpolymer into circular plaques of about 1.5-2.0 mm thick. The plaques are further cut into 25 mm diameter disks and sandwiched between the plate fixtures of the TA Instrument. The oven on the TA instrument is closed for 5 minutes after sample loading and before setting the gap between the plate fixtures to 1.5 mm, opening the oven to trim the edges of the sample, and reclosing the oven. A logarithmic frequency sweep between 0.1 to 100 radians/second at 190° C., 300 seconds of soak time, and 10% strain is conducted before and after the creep test to determine whether the sample has degraded. A constant low shear stress of 20 Pascal (Pa) is applied for all of the samples, to ensure that the steady state shear rate is low enough to be in the Newtonian region. Steady state is determined by taking a linear regression for the data in the last 10% time window of the plot of "lg (J(t)) vs. lg(t)", where J(t) is creep compliance and t is creep time. If the slope of the linear regression is greater than 0.97, steady state is considered to be reached, then the creep test is stopped. In all cases in this study, the slope meets the criterion within one hour. The steady state shear rate is determined from the slope of the linear regression of all of the data points, in the last 10% time window of the plot of "ε vs. t", where E is strain. The zero-shear viscosity is determined from the ratio of the applied stress to the steady state shear rate.

$^{13}C$ NMR Method

The polymer composition was determined using the $^{13}C$ NMR spectroscopy method in accordance with ASTM D5017-96. The evaluation was conducted as follows. The samples are prepared by adding approximately 3 g of a 50/50 mixture of tetrachloroethane-d2/orthodichlorobenzene, containing 0.025 M $Cr(AcAc)_3$, to a 0.25 g polymer sample in a Norell 1001-7 10 mm NMR tube. Then, oxygen is removed from the sample by purging the tube headspace with nitrogen. The samples are then dissolved and homogenized by heating the tube and its contents to 150° C. using a heating block and heat gun. Each sample is visually inspected to ensure homogeneity. The samples are thoroughly mixed immediately prior to analysis, and are not allowed to cool before insertion into the heated NMR probe. This is necessary to ensure the sample is homogeneous and representative of the whole. All data are collected using a Bruker 400 MHz spectrometer equipped with a Bruker cryoprobe. The data is acquired using a 6 second pulse repetition delay, 90-degree flip angles, and inverse gated decoupling with a sample temperature of 120° C. All measurements are made on non-spinning samples in locked mode. The samples are allowed to thermally equilibrate for 7 minutes prior to data acquisition. The $^{13}C$ NMR chemical shifts are internally referenced to the EEE triad at 30 ppm.

$^{13}C$ NMR Comonomer Content: It is well known to use NMR spectroscopic methods for determining polymer composition. ASTM D5017-96; J. C. Randall et al., in "NMR and Macromolecules" ACS Symposium series 247; J. C. Randall, Ed., Am. Chem. Soc., Washington, D.C., 1984, Ch. 9; and J. C. Randall in "Polymer Sequence Determination", Academic Press, New York (1977) provide general methods of polymer analysis by NMR spectroscopy.

Film Density Calculation

Film density is calculated according to the volume percentage (vol %) of each individual layer and its corresponding layer density. Volume percentage of each individual layer is obtained by taking the ratio of the thickness of that layer to the overall film thickness. In the case that the layer contains more than one component, the layer density is calculated based on the weight percentage (wt. %) of each component and its corresponding density measured by ASTM D792, Method B.

$$\text{Layer Density} = \frac{1}{\frac{\text{wt \% of component 1}}{\text{component 1 density}} + \frac{\text{wt \% of component 2}}{\text{component 2 density}}} \quad \text{(Eq. 9a)}$$

$$\begin{aligned}\text{Film Density} = &\text{ vol \% of layer 1} \times \text{density of layer 1} + \\ &\text{vol \% of layer 2} \times \text{density of layer 2} + \\ &\text{vol \% of layer 3} \times \text{density of layer 3} + \\ &\text{vol \% of layer 4} \times \text{density of layer 4} + \\ &\text{vol \% of layer 5} \times \text{density of layer 4}\end{aligned} \quad \text{(Eq. 9b)}$$

Properties of Resins and Films Made from these Resins

INNATE™ ST50 is commercially available from Dow, Inc. EXCEED™ 1018 and ENABLE™ 2005 are commercially available from ExxonMobil Chemical. The properties of the linear low-density polyethylene (LLDPE) resin are as follows (all properties are measured according to the Test Methods Section).

TABLE 2

| Product | Unit | INNATE ™ ST50 | EXCEED ™ 1018 | ENABLE ™ 2005 |
|---|---|---|---|---|
| Density | g/cm³ | 0.918 | 0.918 | 0.920 |
| Melt Index ($I_2$) | g/10 min | 0.83 | 1.0 | 0.50 |
| Melt Index ($I_{10}$) | g/10 min | 6.99 | 5.68 | 5.33 |
| Melt Index ($I_{21}$) | g/10 min | 25.06 | 16.21 | 19.32 |
| Melt Index Ratio ($I_{10}/I_2$) | | 8.42 | 5.68 | 10.66 |
| Melt Index Ratio | ($I_{21}/I_2$) | 30.19 | 16.21 | 38.03 |
| $M_{w(GPc)}$ | g/mol | 113,095 | 107,620 | 104,224 |
| $M_{w(GPC)}/M_{n(GPC)}$ | | 3.65 | 2.56 | 3.50 |
| 7.0 − 1.2 × log(I2) | | 7.1 | 7.0 | 7.4 |
| Density | g/cm³ | 0.918 | 0.918 | 0.920 |
| MWCDI | | 2.56 | −0.06 | 0.53 |
| ZSVR | | 1.96 | 1.21 | 10.85 |

UNIVAL™ DMDH-6400 NT 7 High Density Polyethylene Resin (DMDH 6400) and AGILITY™ 1200 are commercially available from Dow, Inc. The properties of the high-density polyethylene (HDPE) and the low-density polyethylene are as follows:

TABLE 3

| Product | Unit | DMDH 6400 | AGILITY ™ 1200 |
|---|---|---|---|
| Melt Index ($I_2$) | g/10 min | 0.80 | 0.23 |
| Density | g/cm³ | 0.961 | 0.920 |

The films were coextruded in the following manner. A number of three and five-layer films are coextruded as shown in Table 4. Each of the above films are fabricated on a LabTech coextrusion film blown line (Type LF-600 with 5-extruder Type LE20-30/C) under the conditions shown in Table 4 to form the multi-layer blown film. Extruder 1 and Extruder 5 are considered outside extruders as they are associated with the skin layers (layer 1 and layer 5) of the multi-layer blown film. Extruder 1 and Extruder 5 are 25 mm in diameter. Extruder 2, Extruder 3, and Extruder 4 are associated with the inner layers (layer 2 and layer 4) and core layer (layer 3) of the multi-layer blown film. Extruder 2, Extruder 3, and Extruder 4 are 20 mm in diameter. Back pressure values for Extruder 3 and 5 are recorded.

TABLE 4

| Parameter Name | Unit | Range |
|---|---|---|
| Layer ratio - Layer 1 by volume | % | See Table 5 |
| Layer ratio - Layer 2 by volume | % | See Table 5 |
| Layer ratio - Layer 3 by volume | % | See Table 5 |
| Layer ratio - Layer 4 by volume | % | See Table 5 |
| Layer ratio - Layer 5 by volume | % | See Table 5 |
| Total Thickness | μm | See Table 5 |
| Air Temperature | °C. | 15 |
| Layflat | mm | 295 |
| Blow Up Ratio (B.U.R.) | | 2.5 |
| Die gap | mm | 2.0 |
| Line Speed | m/min | 3.35 |
| Structure | | 1/2/3/4/5 |
| Total Output | kg/h | 13.6 |
| Die Temperature | °F. | 440 |
| Temperature-Zone 01 - Extruder 1 | °F. | 375 |
| Temperature-Zone 02 - Extruder 1 | °F. | 425 |
| Temperature-Zone 03 - Extruder 1 | °F. | 440 |
| Temperature-Zone 04 - Extruder 1 | °F. | 440 |
| RPM - Extruder 1 | rpm | 60-70 |
| Current - Extruder 1 | % | 75 |
| Melt temperature - Extruder 1 | °F. | 435 |
| Temperature-Zone 01 - Extruder 2 | °F. | 375 |
| Temperature-Zone 02 - Extruder 2 | °F. | 425 |
| Temperature-Zone 03 - Extruder 2 | °F. | 440 |
| RPM - Extruder 2 | rpm | 80-95 |
| Current - Extruder 2 | % | 60 |
| Melt temperature - Extruder 2 | °F. | 439 |
| Temperature-Zone 01 - Extruder 3 | °F. | 375 |
| Temperature-Zone 02 - Extruder 3 | °F. | 425 |
| Temperature-Zone 03 - Extruder 3 | °F. | 440 |
| RPM - Extruder 3 | rpm | 70-80 |
| Current - Extruder 3 | % | 70 |
| Melt temperature - Extruder 3 | °F. | 445 |
| Temperature-Zone 01 - Extruder 4 | °F. | 375 |
| Temperature-Zone 02 - Extruder 4 | °F. | 425 |
| Temperature-Zone 03 - Extruder 4 | °F. | 440 |
| RPM - Extruder 4 | rpm | 100-120 |
| Current - Extruder 4 | % | 544 |

TABLE 4-continued

| Parameter Name | Unit | Range |
|---|---|---|
| Melt temperature - Extruder 4 | °F. | 435 |
| Temperature-Zone 01 - Extruder 5 | °F. | 375 |
| Temperature-Zone 02 - Extruder 5 | °F. | 425 |
| Temperature-Zone 03 - Extruder 5 | °F. | 440 |
| Temperature-Zone 04 - Extruder 5 | °F. | 440 |
| RPM - Extruder 5 | rpm | 60-70 |
| Current - Extruder 5 | % | 76 |
| Melt temperature - Extruder 5 | °F. | 433 |

Table 5 describes 3 layer film structure of Comparative Example A. Table 6 list the S-layer film structures of Examples 1-4 and Comparative Examples B-F. *Example 4 has one skin layer comprised of 100 wt. % INNATE™ ST50 and the other skin layer comprised of 95 wt. % INNATE™ ST50 and 5 wt. % AGILITY™ 1200. The other Examples have the same composition in both skin layers. **Layer distribution denotes volume percentage of each layer based on the total volume of the film. Examples 1-4 and Comparative Examples A-F have a density of 0.931 g/cm³.

TABLE 5

3-Layer Film Structures

| | Skin | Core | Layer Distribution** (Skin/Core/Skin) | Thickness (μm) |
|---|---|---|---|---|
| Comparative Example (CE) A | 95 wt. % INNATE™ ST50 + 5 wt. % AGILITY™ 1200 | 60 wt. % INNATE™ ST50 + 40 wt. % DMDH 6400 | 25%/50%/25% | 100 |

TABLE 6

5-Layer Film Structures

| | Skin | Inner | Core | Layer Distribution** (Skin/Inner/Core/Inner/Skin) | Thickness (μm) |
|---|---|---|---|---|---|
| Example (EX) 1 | 95 wt. % INNATE™ ST50 + 5 wt. % AGILITY™ 1200 | 100 wt. % DMDH 6400 | 100 wt. % INNATE™ ST50 | 25%/15%/20%/25%/25% | 100 |
| EX 2 | 95 wt. % INNATE™ ST50 + 5 wt. % AGILITY™ 1200 | 100 wt. % DMDH 6400 | 100 wt. % INNATE™ ST50 | 25%/15%/30%/15%/20% | 100 |
| CE B | 95 wt. % INNATE™ ST50 + 5 wt. % AGILITY™ 1200 | 50 wt. % DMDH 6400 + 50 wt. % INNATE™ ST50 | 75 wt. % DMDH 6400 + 25 wt. % INNATE™ ST50 | 25%/15%/20%/15%/25% | 100 |
| CE C | 95 wt. % INNATE™ ST50 + 5 wt. % AGILITY™ 1200 | 80 wt. % DMDH 6400 + 20 wt. % INNATE™ ST50 | 32 wt. % DMDH 6400 + 68 wt. % INNATE™ ST50 | 25%/15%/20%/25%/25% | 100 |
| EX 3 | 100 wt. % INNATE™ ST50 | 100 wt. % DMDH 6400 | 100 wt. % INNATE™ ST50 | 25%/15%/20%/25%/25% | 100 |

TABLE 6-continued

5-Layer Film Structures

| | Skin | Inner | Core | Layer Distribution** (Skin/Inner/Core/Inner/Skin) | Thickness (μm) |
|---|---|---|---|---|---|
| EX 4* | one skin layer (Extruder 5): 100 wt. % INNATE ™ ST50 the other skin layer (Extruder 1): 95 wt. % INNATE ™ ST50 + 5 wt. % AGILITY ™ 1200 | 100 wt. % DMDH 6400 | 100 wt. % INNATE ™ ST50 | 25%/15%/20%/25%/25% | 100 |
| CE D | 95 wt. % EXCEED ™ 1018 + 5 wt. % AGILITY ™ 1200 | 100 wt. % DMDH 6400 | 100 wt. % EXCEED ™ 1018 | 25%/15%/20%/25%/25% | 100 |
| CE E | 100 wt. % ENABLE ™ 2005 | 100 wt. % DMDH 6400 | 100 wt. % ENABLE ™ 2005 | 25%/15%/20%/15%/25% | 100 |
| CE F | 60 wt. % EXCEED ™ 1018 + 40 wt. % ENABLE ™ 2005 | 100 wt. % DMDH 6400 | 100 wt. % EXCEED ™ 1018 | 25%/15%/20%/15%/25% | 100 |

TABLE 7

| | Creep Strain % (CD) | Dart Drop (g) | MD Elmendorf Tear (gf) | CD Elmendorf Tear (gf) | 2% MD Secant Modulus (Mpa) | 2% CD Secant Modulus (Mpa) | Extruder 3 (core layer) Pressure (psi) | Extruder 5 (skin layer) Pressure (psi) |
|---|---|---|---|---|---|---|---|---|
| CE A | 45.5 | 603 | 1138 | 1977 | 414 | 415 | 3082 | 2815 |
| EX 1 | 30 | 552 | 1405 | 2232 | 421 | 450 | 2524 | 2879 |
| EX 2 | 34.5 | 720 | 632 | 1159 | 378 | 398 | 2560 | 2860 |
| CE B | 41 | 576 | 748 | 1438 | 423 | 418 | 3200 | 2875 |
| CE C | 42 | 558 | 1031 | 1594 | 412 | 419 | 3030 | 2861 |
| EX 3 | 19.5 | 546 | 812 | 1245 | 442 | 449 | 2544 | 2882 |
| EX 4* | 26.7 | 660 | 411 | 774 | 519 | 549 | 2532 | 2853 |
| CE D | 18.7 | 528 | 669 | 1207 | 444 | 457 | 3366 | 3014 |
| CE E | 20.7 | 510 | 885 | 1201 | 392 | 385 | 3602 | 2955 |
| CE F | 34.8 | 474 | 679 | 1196 | 398 | 403 | 3602 | 2987 |

Results

Table 7 lists the test results for Examples 1-4 and Comparative Examples A-F. Examples 1-4 have an increased creep resistance and an increased or maintained Dart Drop as well as better processability (as indicated by the lower extruder back pressure). For example, Examples 1-4 have a combination of improved Creep Strain, Dart Drop, and processability (e.g., lower extruder back pressure) compared to Comparative Examples A-F, which together produce a down-gauged multi-layer blown film that does not compromise the integrity and strength required for multi-layer blown film nor does it adversely affect the Secant Modulus.

What is claimed:

1. A multi-layer blown film, comprising:
a first skin layer and a second skin layer, wherein at least one of the first skin layer and the second skin layer comprises from 80 to 100 weight percent (wt. %) of a linear low density polyethylene (LLDPE), wherein the LLDPE has a density from 0.910 to 0.935 g/cm$^3$, a melt index ($I_2$, 2.16 kg, 190° C.) from 0.2 to 2 g/10 min, a molecular weight distribution (MWD) from 2.5 to 5.5, a molecular weight comonomer distribution index (MWCDI) value from 0.9 to 10, a melt index ratio ($I_{10}/I_2$, $I_{10}$, 10 kg, 190° C.) that meets the following equation: $I_{10}/I_2$ 7.0-1.2× log ($I_2$), and a zero shear viscosity ratio (ZSVR) value from 1.0 to 3.0;
a core layer between the first skin layer and the second skin layer, wherein the core layer comprises from 70 to 100 wt. % of a second LLDPE, the second LLDPE having density from 0.910 to 0.935 g/cm$^3$, the wt. % based on a total weight of the core layer, a melt index ($I_2$, 2.16 kg, 190° C.) from 0.2 to 2 g/10 min, a MWD from 2.5 to 5.5, a MWCDI value from 0.9 to 10, a melt index ratio that meets the following equation: $I_{10}/I_2 \geq 7.0-1.2\times \log (I_2)$, and a ZSVR value from 1.0 to 3.0;
a first inner layer and a second inner layer, wherein at least one of the first inner layer and the second inner layer comprises from 80 to 100 wt. % of a high density polyethylene (HDPE), wherein the HDPE has a density from 0.940 to 0.970 g/cm$^3$; and
wherein the multi-layer blown film has a density from 0.925 to 0.940 g/cm$^3$ as tested with ASTM D792, Method B, and a total thickness from 75 to 140 μm; wherein the film has a creep strain of less than 20% as tested with ASTM D618; and wherein the core layer comprises from 10 to 40 volume percent (vol. %) of the multi-layer blown film, the vol. % is based on a total volume of the multi-layer blown film.

2. The multi-layer blown film of claim 1, wherein the film has a dart drop from 540 to 750 g at a film thickness of 100 μm as tested with ASTM D1709, method A, Aluminum dart head.

3. The multi-layer blown film of claim 1, wherein each of the first inner layer and the second inner layer comprises from 10 to 30 volume percent (vol. %) of the multi-layer blown film, the vol. % is based on a total volume of the multi-layer blown film.

4. The multi-layer blown film of claim 1, wherein each of the first skin layer and the second skin layer comprises from 10 to 30 volume percent (vol. %) of the multi-layer blown film, the vol. % is based on a total volume of the multi-layer blown film.

5. The multi-layer blown film of claim 1, wherein the multi-layer blown film has a density from 0.925 to 0.935 g/cm$^3$ as tested with ASTM D792, Method B.

6. The multi-layer blown film of claim 1, wherein a combination of the LLDPE and the second LLDPE is present in an amount of 10 to 80 volume percent (vol. %) based on total volume of the multi-layer blown film.

7. The multi-layer blown film of claim 1, wherein the multi-layer blown film has a total thickness from 70 to 120 μm.

8. The multi-layer blown film of claim 1, wherein the multi-layer blown film has five layers.

9. The multi-layer blown film of claim 1, wherein the first inner layer and the second inner layer comprise the HDPE and have the same composition.

10. A heavy duty shipping sack comprising the multi-layer blown film of claim 1.

11. A method of forming a multi-layer blown film, comprising the steps of:
preparing a first skin layer and a second skin layer, wherein at least one of the first skin layer and the second skin layer comprises from 80 to 100 weight percent (wt. %) of a linear low density polyethylene (LLDPE) having a density from 0.910 to 0.935 g/cm$^3$, a melt index ($I_2$, 2.16 kg, 190° C.) from 0.2 to 2 g/10 min, a molecular weight distribution (MWD) from 2.5 to 5.5, a molecular weight comonomer distribution index (MWCDI) value from 0.9 to 10, a melt index ratio $I_{10}/I_2$, $I_{10}$, 10 kg, 190° C.) that meets the following equation: $I_{10}/I_2 \geq 7.0 - 1.2 \times \log (I_2)$, and a ZSVR value from 1.0 to 3.0;
preparing a core layer between the first skin layer and the second skin layer, wherein the core layer comprises from 70 to 100 wt. % of a second LLDPE, the second LLDPE having a density from 0.910 to 0.935 g/cm$^3$, the wt. % based on a total weight of the core layer, a melt index ($I_2$, 2.16 kg, 190° C.) from 0.2 to 2 g/10 min, a MWD from 3.0 to 5.5, a MWCDI value from 0.9 to 10, a melt index ratio ($I_{10}/I_2$) that meets the following equation: $I_{10}/I_2 \geq 7.0 - 1.2 \times \log (I_2)$, and a ZSVR value from 1.0 to 3.0;
preparing a first inner layer and a second inner layer, wherein at least one of the first inner layer and the second inner layer comprises from 80 to 100 wt. % of a high density polyethylene (HDPE), wherein the HDPE has a density from 0.940 to 0.970 g/cm$^3$; and
forming the multi-layer blown film from the first skin layer and the second skin layer, the core layer, and the first inner layer and the second inner layer, wherein the multi-layer blown film having a film thickness of 100 μm has a dart drop from 540 to 750 g when tested with ASTM D1709, method A, Aluminum dart head; a creep strain of less than 20% as tested with ASTM D618; wherein the multi-layer blown film has a density of from 0.925 to 0.940 g/cm$^3$ as tested with ASTM D792, Method B and a total thickness of 75 to 140 μm, and wherein the core layer comprises from 10 to 40 volume percent (vol. %) of the multi-layer blown film, the vol. % is based on a total volume of the multi-layer blown film.

12. The method of claim 11, wherein forming the multi-layer blown film is done by blown extrusion or co-extrusion.

13. A multi-layer blown film, comprising:
a first skin layer and a second skin layer, wherein at least one of the first skin layer and the second skin layer comprises from 80 to 100 weight percent (wt. %) of a linear low density polyethylene (LLDPE), wherein the LLDPE has a density from 0.910 to 0.935 g/cm$^3$, a melt index ($I_2$, 2.16 kg, 190° C.) from 0.2 to 2 g/10 min, a molecular weight distribution (MWD) from 2.5 to 5.5, a molecular weight comonomer distribution index (MWCDI) value from 0.9 to 10, a melt index ratio ($I_{10}/I_2$, $I_{10}$, 10 kg, 190° C.) that meets the following equation: $I_{10}/I_2 \geq 7.0 - 1.2 \times \log (I_2)$, and a zero shear viscosity ratio (ZSVR) value from 1.0 to 3.0;
a core layer between the first skin layer and the second skin layer, wherein the core layer comprises from 70 to 100 wt. % of a second LLDPE, the second LLDPE having density from 0.910 to 0.935 g/cm$^3$, the wt. % based on a total weight of the core layer, a melt index ($I_2$, 2.16 kg, 190° C.) from 0.2 to 2 g/10 min, a MWD from 2.5 to 5.5, a MWCDI value from 0.9 to 10, a melt index ratio that meets the following equation: $I_{10}/I_2 \geq 7.0 - 1.2 \times \log (I_2)$, and a ZSVR value from 1.0 to 3.0;
a first inner layer and a second inner layer, wherein at least one of the first inner layer and the second inner layer comprises from 80 to 100 wt. % of a high density polyethylene (HDPE), wherein the HDPE has a density from 0.940 to 0.970 g/cm3; and
wherein the multi-layer blown film has a density from 0.925 to 0.940 g/cm$^3$ as tested with ASTM D792, Method B, and a total thickness from 75 to 140 μm;
wherein a combination of the first inner layer and the second inner layer comprises at least 35 volume percent (vol. %) of the multi-layer film; and
wherein the core layer comprises from 10 to 40 volume percent (vol. %) of the multi-layer blown film, the vol. % is based on a total volume of the multi-layer blown film.

* * * * *